United States Patent [19]

Miranda

[11] Patent Number: 4,764,542

[45] Date of Patent: Aug. 16, 1988

[54] SEMI-ORGANIC FOAMS

[75] Inventor: Thomas J. Miranda, Clay Township, St. Joseph County, Ind.

[73] Assignee: Whirlpool Corporation, Benton Harbor, Mich.

[21] Appl. No.: 112,547

[22] Filed: Oct. 26, 1987

Related U.S. Application Data

[62] Division of Ser. No. 948,116, Dec. 31, 1986, Pat. No. 4,708,970.

[51] Int. Cl.$^4$ ................................................ C08J 9/14
[52] U.S. Cl. .................................... 521/149; 521/123; 521/131; 521/133; 521/140; 521/150; 521/182; 560/81
[58] Field of Search ............... 521/149, 123, 131, 133, 521/140, 150, 182

[56] References Cited

U.S. PATENT DOCUMENTS

| | | | |
|---|---|---|---|
| 3,652,521 | 3/1972 | Abend | 260/86.1 |
| 3,760,047 | 9/1973 | Gaeth et al. | 264/54 |
| 4,708,970 | 11/1987 | Miranda | 521/123 |

Primary Examiner—Morton Foelak
Attorney, Agent, or Firm—Wood, Dalton, Phillips, Mason & Rowe

[57] ABSTRACT

An in situ foamable semi-organic composition, a half ester compound useful in such a composition and a foam prepared by reacting such an adduct are disclosed. A half ester adduct is prepared by reacting an anhydride and an unsaturated conjugated vinyl hydroxy compound and generally has the structure $$CH_2=CR-COO-R'-O-CO-Z-COOH$$

where,
R=H, CH$_3$, CN, C$_6$H$_{11}$(CYCLOHEXYL),X (X=F, Cl, Br)
R'=—CH$_2$—CH$_2$—, —CXR—CXR—, —(CH$_2$—CH$_2$—)$_n$ where n=1,2, ... 8, and
Z=—CH=CH—, phthalic, trimellitic, α-naphthoic, β-naphthoic, substituted phthalic anhydrides of the structure

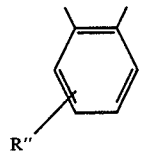

wherein R″=Cl, F, Br, I, CH$_3$, CN, CH$_3$, C$_n$H$_{2n+2}$.

The foamable semi-organic composition, in addition to the half ester adduct, includes a fluorocarbon blowing agent and an initiator.

17 Claims, No Drawings

SEMI-ORGANIC FOAMS

This is a division of application Ser. No. 948,116 filed Dec. 31, 1986, U.S. Pat. No. 4,708,970, Nov. 24, 1987.

BACKGROUND OF THE INVENTION

1. Field of the Invention

This invention relates generally to polymeric foams and, more particularly, this invention relates to semi-organic foams and in situ foaming processes.

2. Description of the Related Art

Cellular polymeric structures, i.e., foams, are well known in the art and have found extensive use as insulating, packaging and construction materials. Such cellular structures have, in the past, been made from a variety of polymers, including polyurethanes, polystyrenes, cellulose esters and polyvinyl chloride.

Such foam structures can be produced in a variety of forms including, for example, slabs, blocks, boards, sheets, molded shapes, sprayed coatings and extruded insulation. They can also be "foamed-in-place" in an existing space. In such in situ processes, the foamable composition is poured into a space or cavity in a liquid or molten form and allowed to foam. In situ foaming processes are, in many instances, preferred because they greatly facilitate and simplify the necessary production and handling procedures and equipment.

Many conventional foaming processes require that the foamable composition be kept in a substantially dry, i.e., water free, condition. (See, for example, U.S. Pat. No. 3,760,047 issued Sept. 18, 1973 to Gaeth et al and U.S. Pat. No. 3,652,521 issued Mar. 28, 1972 to Abend.) Such systems, because of the difficulty involved with moisture exclusion, find limited practical use.

Urethane foams have become the standard material used for refrigerator insulation. Urethane foams are generally prepared by reacting hydroxyl-terminated compounds called polyols (usually of the polyester or polyether family) with an isocyanate. Generally, such foams are produced by co-reacting the isocyanate and the polyol with processing modifiers such as flow additives and catalysts.

Urethane foams are produced by reactions which can be carried out in a single stage or in a sequence of several stages. Thus, the two principal methods of preparing urethane foams are the one-shot and the prepolymer methods.

In the one-shot method, all the ingredients are mixed together simultaneously and the resulting mixture is allowed to foam.

In the prepolymer method, a portion of the polyol is prereacted with a large excess of the isocyanate to yield a prepolymer. The prepolymer is then subsequently mixed with additional polyol, catalysts and other additives to effect the foaming action. Thus, the prepolymer method necessitates the intermediate step of forming the prepolymerized component.

For ease of production and manufacture, foaming processes whereby the foam is prepared in essentially a one-step process wherein the composition components are mixed and reacted are frequently preferred.

A major disadvantage with the commonly used urethane foams is that one of the starting materials for such foams is an isocyanate which is both a toxic and a respiratory sensitizer to man.

SUMMARY OF THE INVENTION

It is an object of the present invention to overcome one or more of the problems described above.

According to the invention, an in situ foamable semi-organic composition is provided. The composition includes a half ester adduct prepared by reacting an anhydride and an unsaturated conjugated vinyl hydroxy compound, a fluorocarbon blowing agent and an initiator.

In addition to the above-described composition, the invention comprehends a half ester compound usable in such in situ foamable compositions as well as foams prepared by reacting such half ester adducts with a fluorocarbon blowing agent and an initiator.

Other objects and advantages of the invention will be apparent to those skilled in the art from the following detailed description, taken in conjunction with the appended claims.

DETAILED DESCRIPTION OF THE INVENTION

This invention utilizes an in situ process for converting an adduct alone or in combination with polyfunctional monomers or prepolymers such that the exotherm of the polymerization serves to catalyze the reaction whereby foaming occurs resulting in a crosslinked foam.

An adduct adapted for use in this in situ foaming process is a half ester prepared by reacting an anhydride with a conjugated vinyl unsaturated hydroxy compound. Maleic anhydride is a preferred anhydride for the preparation of the adduct. While derivatives of maleic anhydride, such as fumaric acid, can be used, their use would likely necessitate the preliminary esterification of the derivative and thereby make the process both more costly, because of the high temperatures generally required for esterification, and more difficult to carry out.

Saturated anhydrides, such as phthalic anhydride, can be used but their use generally necessitates the inclusion of an additional unsaturated monomer or crosslinking agent, such as trimethylol propane triacrylate, to provide the desired degree of crosslinking, whereas the adduct prepared with the preferred maleic anhydride or other effective unsaturated anhydride can be used to foam, polymerize and crosslink without the addition of such unsaturated processing aids.

It is to be understood, however, that while unsaturated anhydrides are preferred, this invention does not preclude the use of saturated anhydrides. In fact, for economic reasons and for reducing the exotherm generated upon reaction, a saturated anhydride, such as the reaction product of 2-hydroxyethyl acrylate and phthalic anhydride, can be added to the half ester adduct described above without departing from the spirit of the invention. For example, adducts can be prepared from the prepared maleic anhydride and blended with adducts prepared from phthalic anhydride and 2-hydroxethyl acrylate in varous ratios to reduce the exotherm generated by the foaming reaction. By using a blend of an adduct prepared from an unsaturated anhydride and an adduct prepared with a saturated anhydride, a composition resulting in a closed cell foam and having a lower exotherm can more easily be produced.

Thus, maleic, phthalic, trimellitic, succinic, endomethylene cyclohexane tetra carboxylic anhydride and pyromellitic dianhydride may, for example, be utilized as an anhydride in the preparation of the half ester adduct of the invention.

The unsaturated hydroxy compound used in the preparation of the adduct of the invention is of an acrylic type, such as a conjugated vinyl compound, so as to permit extensive polymerization of the adduct. Examples of unsaturated conjugated vinyl hydroxy compounds usable in the practice of the invention include hydroxyethyl acrylate (HEA), hydroxyethyl methacrylate, hydroxypropyl acrylate, hydroxypropyl methacrylate, allyl alcohol, and diallyl alcohol.

In the practice of this invention, 2-hydroxyethyl acrylate and maleic anhydride are preferred reactants. The acrylate component provides a functional site for polymerization while the maleic anhydride component provides additional unsaturation by which the resultant foam may self crosslink or crosslink with other unsaturated functional monomers or prepolymers such as, for example, trimethylolpropane triacrylate, pentaerythritol triacrylate, 1,6 hexanediol diacrylate, polybutadienes or acrylated bis phenols such as "DERAKANE" resins obtained from the Dow Chemical Company, Midland, Mich.

The general structural formula of the adduct of the invention is:

$$CH_2=CR—COO—R'—O—CO—Z—COOH$$

where,

R=H, $CH_3$, CN, $C_6H_{11}$(CYCLOHEXYL), X (X=F, Cl, Br)

R'=—$CH_2$—$CH_2$—, —CXR—CXR—, —($CH_2$—$CH_2$—$)_n$ where n=1, 2, ... 8

Z=—CH=CH—, phthalic, trimellitic, α-naphthoic, β-naphthoic, substituted phthalic anydrides of the structure

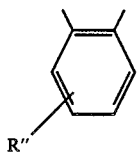

where R''=Cl, F, Br, I, $CH_3$, CN, $CH_3$, $C_nH_{2n+2}$

The structural features of the adducts of the invention are illustrated below with reference to the adduct (identified herein as ADDUCT I) formed using the preferred reactants, 2 hydroxyethyl acrylate and maleic anhydride:

$$CH_2=CH—COOCH_2—CH_2—OCO—CH=CH—COOH \quad \text{(ADDUCT I)}$$

The addition polymerization site is an active acrylic unsaturation which can be initiated by initiators such as peroxides, heat, uv light, percarbonates, azo initiators, redox initiators or electron beam radiation.

Alternatively, the initiator may be an organic initiator such as azobisisobutyronitrile (AIBN), benzoyl peroxide or ditertiarybutyl peroxide or an inorganic initiator such as ammonium or potassium persulfate or other initiators known to those skilled in the art and guided by the teachings herein.

While single species of initiators are suitable for the practice of this invention, a preferred method is to use two or more initiators, each having a different half life, thereby attaining the benefits of the inclusion of an initiator over a broader temperature range. For example, a combination of azobisisobutyronitrile (AIBN), which degrades at a relatively low temperature, and benzoyl peroxide, which degrades at a relatively high temperature, may be used to effect cure and to scavenge residual unsaturation over a broader temperature range than realized with a single species of initiator alone.

The carboxylic acid group on the side of ADDUCT I opposite the addition polymerization site serves as a foam initiating site. The foam initiating site is reactive with inorganic bases, such as alkali metal hydroxides, so as to create an exotherm by which the initiator decomposes and initiates radical polymerization. Sufficient exotherm is generated in the practice of the invention to allow in situ polymerization and foaming of the composition.

The crosslinking site derived from maleic anhydride is the carbon-carbon double bond of ADDUCT I internal of the foam initiating carboxylic acid group and provides a functionality to allow the adduct to copolymerize with the acrylic component and with other co-monomers that are added to the composition.

ADDUCT I is prepared from generally equimolar portions of maleic anhydride and 2 hydroxyethyl acrylate (or methacrylate). Adducts can, for example, also be prepared from modified acrylics such as the reaction product of acrylic acid and caprolactone and sold by Union Carbide under the trade name Tone monomer.

Also, the adducts of the invention can be copolymerized with other unsaturated compounds. These co-reactant materials are generally monomeric and do not have a high molecular weight. The co-reactants are preferably unsaturated, e.g., contain one or more double bonds, to permit crosslinking thereof with the adduct and may be added to provide increased flexibility or rigidity in the foam, for example. Co-reactants useful in the practice of this invention include polyfunctional monomers selected from acrylated and methacrylated esters of ethylene glycol, glycerol, trimethylol ethane (propane), pentaerythritol, dipentaerythritol, butylene glycol, hexanediol, butyrolactone, caprolactone and related derivatives.

Alternatively, the half ester adduct of the invention may be crosslinked with a diluent polymer so as to improve flexibility and reduce brittleness, for example. Further, these diluent polymers, being generally of comparatively low cost as compared to the raw materials used for the adduct, provide a means by which the cost of the total composition may be reduced. Diluent polymers useful for improving flexibility include norbornene rubbers, ethylene propylene rubber, low molecular weight polyethylene, atactic polypropylene, poly 1-butene, polybutadienes and related polymers.

In addition, allyl ethers and esters can be used as reactive diluents which participate in the crosslinking of the adduct through either of the functional groups of the adduct.

The adduct of the invention has many uses including, for example, use as a molded plastic and in the polymerization of conductive polymers. A preferred use for the adduct of the invention is in in situ foamable semiorganic compositions particularly adapted to provide a thermal insulating foam such as used for refrigeration insulation, for example.

For such foamable compositions, blowing agents, crosslinking agents, initiators and, if desired, filler materials are added to the adduct to attain desired properties in the composition and the foam formed thereby.

In the foamable composition, a polyfunctional monomer or oligomer crosslinking agent, such as trimethylol propane triacrylate, may be added in an amount sufficient to react with the adduct and to crosslink with the adduct.

The foamable composition includes a blowing agent such as a fluorocarbon such as 1,1,2 trichloro, 1, 2, 2 trifluoroethane (or bromine derivatives) or other blowing agents known to those skilled in the art. (Hereinafter, the use of the term "fluorocarbon" in reference to chemical blowing agents also encompasses the bromine derivatives thereof.)

The foamable composition of the invention may, if desired, include a filler material. Such filler materials may be added to the composition so as to reduce the material cost of the entire composition. Also, the filler material (calcium carbonate, for example) may, in part, serve as a blowing agent in the composition to facilitate the foaming thereof. Examples of filler materials useful in the practice of the invention include the inorganic carbonates of sodium, calcium, magnesium, barium, strontium, or potassium, with magnesium carbonate being preferred because of its value in providing heat resistance and imparting flame resistance. Also, filler materials such as magnesium or aluminum hydroxide may be added to impart fire retardancy.

The following examples illustrate the practice of the present invention. It is to be understood that all changes and modifications that come within the spirit of the invention are desired to be protected and thus the invention is not to be construed as limited by these examples.

ADDUCT PREPARATION 464 grams of 2-hydroxyethyl acrylate (HEA) and 392 grams of maleic anhydride were charged into a 2000 ml three neck flask equipped with a thermometer, a stirrer, and an inert gas inlet. Stirring was begun and an inert gas (nitrogen) purge was initiated at a rate of 0.2 cc per minute. The charged flask was slowly heated to 60° C. and held ±5° C. for two hours. (To prevent premature polymerization of the monomer HEA, the temperature was not permitted to rise substantially above 60° C.) Premature polymerization can be prevented by adding up to 100 ppm of a stabilizer such as methylether hydroquinone or effective amounts of other stabilizers known to those in the art. After two hours, the reaction product was sampled and an acid number was obtained by titrating the adduct formed with a solution of alcoholic KOH and was found to be 256.5. (The acid number was used as a parameter to measure the extent of the reaction. The acid number of the pure adduct, assuming complete reaction, is 262.) This adduct, ADDUCT I, was then used for subsequent foaming reactions as described below:

EXAMPLE I

The following ingredients were blended in a 500 ml beaker:

| ADDUCT I | 122 grams |
| --- | --- |
| Benzoyl peroxide | 3.0 grams |
| AIBN* | 3.0 grams |
| Water | 21.0 grams |
| Freon 11 | 50.0 grams |
| LK 5340 (surfactant) | 1.0 grams |

*azobisisobutyronitrile

After mixing for one minute, 22.0 grams of magnesium hydroxide, Mg(OH)$_2$, were added and the mixture was stirred for thirty seconds at which time Freon gas bubbled from the mixture. After a mixing time of about two minutes the viscosity increased and the composition foamed with the evolution of steam and heat.

EXAMPLE II

The reaction in Example I was repeated but with 4 times the quantities used in the first example. After adding the magnesium hydroxide and stirring, the mixture was poured into a cardboard box lined with aluminum foil. The entire box was filled with foam and the foam was allowed to set overnight. The set foam, however, contained a number of fractures therein. The foam was cut into 1 inch thick square slabs, measuring 12 inches by 12 inches, which were then analyzed to determine the k factor of the foam material. The result was a foam with a k factor of:

$$k = 0.31836 \text{ BTU-in/°F. hr.ft}^2$$

[Under the same conditions, a fiberglass standard (Owens-Corning Fiberglas Corp., Fiberglas OCF HT-26, with a nominal k=0.260), had a k factor of k=0.21800 Btu-in/°F. hr.ft$^2$, while a urethane foam (polyether polyol-TDI foam refrigeration insulation) had a k factor of k=0.24872 Btu-in/°F. hr.ft$^2$]

Generally, low k factors are desired in insulating materials. The fractures contained in the inventive foam samples might account for the higher k values realized with the tested samples.

EXAMPLE III

To enhance crosslinking and to demonstrate the utility of the adduct of the invention in the preparation of foams, other functional monomers can be used. This is illustrated below:

| Part I. | ADDUCT I | 300 grams |
| --- | --- | --- |
| | Freon 11 | 150 grams |

The ADDUCT I was mixed with the Freon II until a homogeneous mixture was obtained.

| Part II. | Trimethylolpropane triacrylate | 61 grams |
| --- | --- | --- |
| | Benzoyl peroxide | 3 grams |
| | Water | 61 grams |
| | Diallyl phthalate | 5 grams |

The above-identified components of Part II were blended together for one hour. Then 60 grams of magnesium hydroxide were added to the blend of Part II.

Part I and II were rapidly blended and mixed together in a one quart paper cup and, after 20 seconds, a reaction began, with the composition foamed to fill the cup and expand out of the cup to about two times the height of the cup.

EXAMPLE IV

A foam was prepared as follows:

| Part A. | ADDUCT I | 464 grams |
| --- | --- | --- |
| | Calcium carbonate | 464 grams |
| Part B. | Trimethylolpropane triacrylate | 110 grams |
| | Benzoyl peroxide | 20 grams |
| | Magnesium hydroxide | 110 grams |
| | Water | 110 grams |
| | Freon 11* | 110 grams |

*Freon 11 is trichloromonofluoromethane, b.p. = 74.8° F.

Freon 11 was added last, just prior to the mixing together of parts A and B which were blended together with a high speed mixer and cast into a mold. Within about 30 seconds the composition began to foam and rise. The foam filled the mold which was placed in a water bath at 60° C. The k factor of the foam was found to be $$k = 0.455 \text{ BTU-in/°F. hr.ft}^2$$

The foam texture was mostly open cell hence a high k factor.

EXAMPLE V

To reduce the foam viscosity, solvents were added. ADDUCT I was used as follows:

| Part A. | ADDUCT I | 725 grams |
| --- | --- | --- |
| | Calcium carbonate | 175 grams |
| | Benzoyl peroxide | 30 grams |
| | Methyl ethyl ketone | 30 grams |
| | Freon 11 (added later) | 150 grams |

This mixture was blended with a laboratory stirrer and the viscosity measured using a Brookfield Viscometer with a #3 spindle at 20 rpm and was found to be 350 centipoise (cps).

An additional 185 grams of calcium carbonate were added, the sample was mixed and the viscosity was measured and found to be 1300 cps. Freon 11 was added and the mixture was stirred. The sample had a viscosity of 450 cps.

The second component was formulated as follows:

| Part B. | Trimethylolpropane triacrylate | 150 grams |
| --- | --- | --- |
| | Magnesium hydroxide | 150 grams |
| | Water | 150 grams |
| | Ethyl alcohol | 100 grams |

Part B had a viscosity of 1700 cps.

Parts A and B were blended in a 4000 ml beaker. The mixture immediately began to foam and was poured into a 12"×12" aluminum mold. After being filled with the composition, the mold was placed in a water bath at 57° C. for 1½ hours. Thereafter, the mold was inspected and found to be only partially filled and some of the foam had not cure. It is believed that the solvent tended to reduce the extent of cure.

Reactant concentration ranges for the practice of the invention may be reviewed from Example IV. (Hereinafter, unless expressly indicated to the contrary, "wt%" refers to the weight percent relative to the total composition.) The total amount of filler [Mg(OH)$_2$ and CaCO$_3$] therein is about 41 wt% and can be generally varied about 30-50 wt%. It is to be understood that a single filler material or a combination of filler materials, such as in Example IV, may be used depending on the specific properties being sought and the specific end use of the foam product. For example, magnesium hydroxide may be added to impart fire retardancy while calcium carbonate may be added to provide a filler which functions, at least in part, as a blowing agent. In example IV, the polymerizable content comprises both ADDUCT I and TMPTA. The polymerizable content (ADDUCT I and TMPTA) is about 41 wt% and can be generally varied between about 35-50 wt%, with a preferred polymerizable content of about 40-45 wt%. It is to be understood that ADDUCT I, itself, may comprise the entire polymerizable content or, alternatively, a crosslinking agent such as TMPTA may comprise 0-10 wt%. The amount of initiator (benzoyl peroxide) is about 3.5 wt% based on the polymerizable content of the composition and can be generally varied between about 0.05 to 10 wt%, with a preferred range of about 3-6 wt%. The amount of blowing agent (freon 11) is about 8 wt% and can generally be varied between about 4-12 wt%.

The foregoing detailed description is given for clearness of understanding only and, no unnecessary limitations should be understood therefrom, as modifications within the scope of the invention will be obvious to those skilled in the art.

I claim:

1. A foam prepared by a process comprising the step of:

reacting a composition comprising a first adduct having the structure

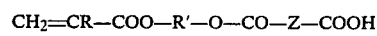
   $$CH_2=CR-COO-R'-O-CO-Z-COOH$$

where,
   R=H, CH$_3$, CN, C$_6$H$_{11}$(CYCLOHEXYL), X (X=F, Cl, Br)
   R'=—CH$_2$—CH$_2$—, —CXR—CXR—, —(CH$_2$—CH$_2$—) where n=1, 2, ... 8, and
   Z=—CH=CH—, phthalic, trimellitic, naphthoic, β-naphthoic, substituted phthalic anydrides of the structure

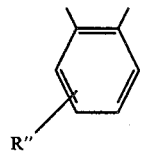

wherein
   R"=Cl, F, Br, I, CH$_3$, CN, CH$_3$, C$_n$H$_{2n+2}$;
   a fluorocarbon blowing agent; and
   an initiator.

2. The foam of claim 1 wherein
   R=H, R'=—CH$_2$—CH$_2$—, and Z=—CH=CH—.

3. The foam of claim 1 wherein said adduct comprises about 35-50 wt% of said composition.

4. The foam of claim 3 wherein said adduct comprises about 40-45 wt% of said composition.

5. The foam of claim 1 wherein said composition additionally comprises a second adduct

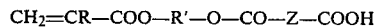
   $$CH_2=CR-COO-R'-O-CO-Z-COOH$$

where,
   R=H, CH$_3$, CN, C$_6$H$_{11}$(CYCLOHEXYL), X (X=F, Cl, Br)

$R' = -CH_2-CH_2-$, $-CXR-CXR-$, $-(CH_2-CH_2-)$ where $n = 1, 2, \ldots 8$, and $Z = -CH=CH-$, phthalic, trimellitic, naphthoic, β-naphthoic, substituted phthalic anydrides of the structure

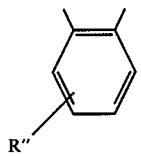

wherein $R'' = Cl$, F, Br, I, $CH_3$, CN, $CH_3$, $C_nH_{2n+2}$;

wherein said first and second adducts comprise different R, R', Z, R" or different combinations thereof.

6. The foam of claim 1 additionally comprising a filler material.

7. The foam of claim 6 wherein said filler material comprises a material selected from the group consisting of magnesium hydroxide, aluminum hydroxide and inorganic carbonates selected from the group consisting of sodium, calcium, magnesium, barium, strontium, and potassium.

8. The foam of claim 6 wherein said filler comprises about 30–50 wt% of said composition.

9. The foam of claim 1 wherein said fluorocarbon blowing agent comprises about 4–12 wt% of said composition.

10. The foam of claim 1 wherein said fluorocarbon blowing agent comprises 1,1,2 trichloro, 1,2,2 trifluoroethane.

11. The foam of claim 1 additionally comprising a crosslinking agent.

12. The foam of claim 11 wherein said crosslinking agent comprises no more than about 10 wt% of said composition.

13. The foam of claim 11 wherein said crosslinking agent comprises trimethylol propane triacrylate.

14. The foam of claim 1 wherein said initiator comprises about 0.05–10 wt% of the polymerizable content of said composition.

15. The foam of claim 14 wherein said initiator comprises about 3–6 wt% of the polymerizable content of said composition.

16. The foam of claim 1 wherein said initiator is an organic initiator selected from the group consisting of AIBN, benzoyl peroxide and ditertiarybutyl peroxide.

17. The foam of claim 1 wherein said initiator comprises an inorganic initiator selected from the group consisting of ammonium and potassium persulfate.

* * * * *